United States Patent [19]

Smith

[11] Patent Number: 5,163,242
[45] Date of Patent: Nov. 17, 1992

[54] HUNTING SPEAR

[76] Inventor: Daniel L. Smith, P.O. Box 252, Coaltan, W. Va. 26257

[21] Appl. No.: 760,377

[22] Filed: Sep. 16, 1991

[51] Int. Cl.$^5$ .............................................. A01K 81/00
[52] U.S. Cl. .................................................. 43/6; 43/1
[58] Field of Search ........................................... 43/6, 1

[56] References Cited

U.S. PATENT DOCUMENTS

| | | | |
|---|---|---|---|
| 3,045,659 | 7/1962 | Malcolm | 43/6 X |
| 3,452,466 | 7/1969 | Heartness | 43/6 |
| 3,456,376 | 7/1969 | Chappell | 43/6 |
| 4,807,382 | 2/1989 | Albrecht | 43/6 |
| 5,033,220 | 7/1991 | Phelps | 43/6 |

Primary Examiner—Richard K. Seidel
Assistant Examiner—Patty E. Hong
Attorney, Agent, or Firm—Leon Gilden

[57] ABSTRACT

A spear structure is defined by an elongate truncated conical body formed with a forward section and rear section intercommunicated by a frangible hollow sleeve arranged for separating the forward section relative to the rear section upon impact. A spring member directed through the sleeve and secured at its upper and lower distal ends to the forward and rear sections secures the forward and rear sections together upon such separation to preserve the rear section for reuse.

2 Claims, 4 Drawing Sheets

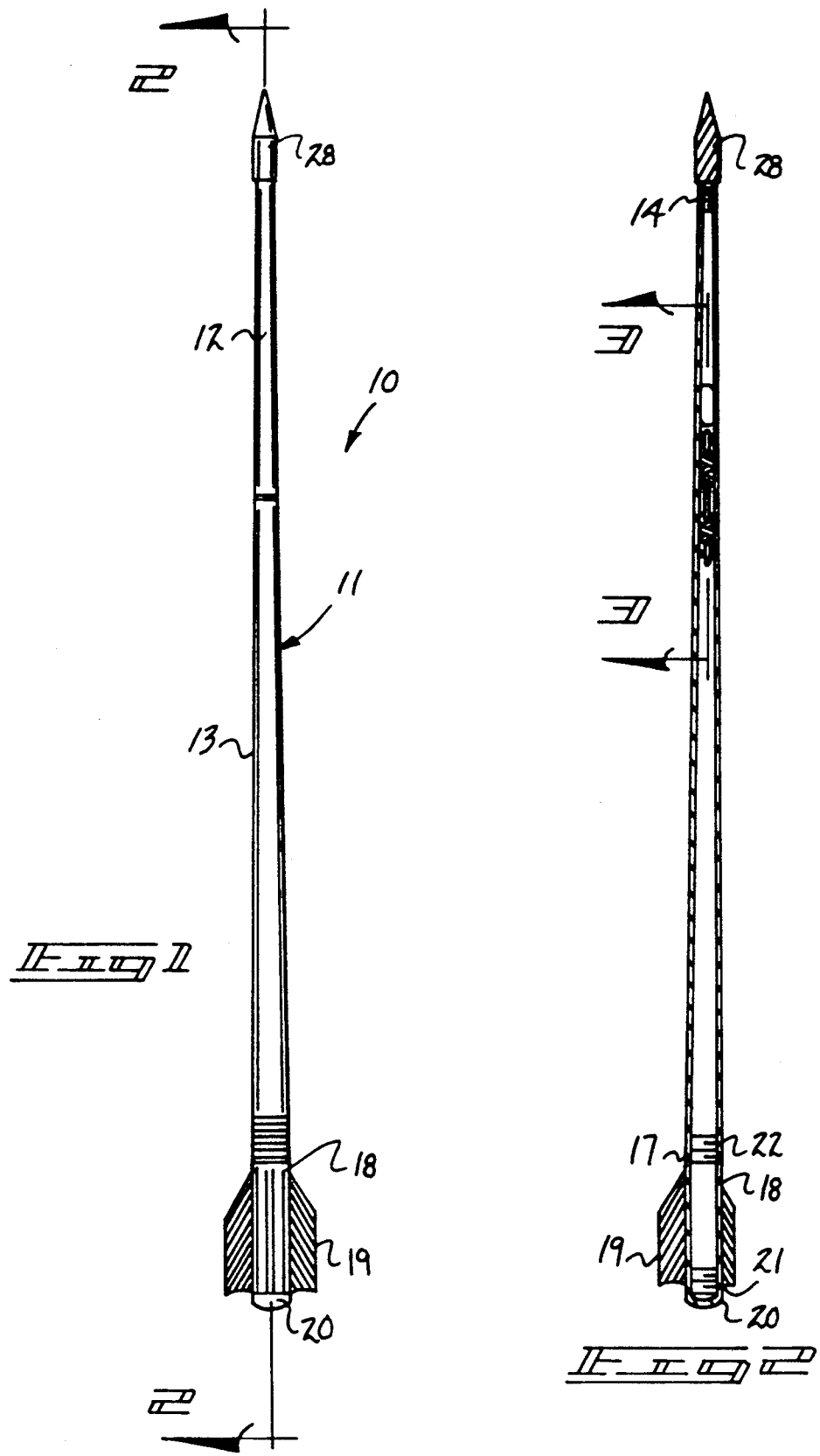

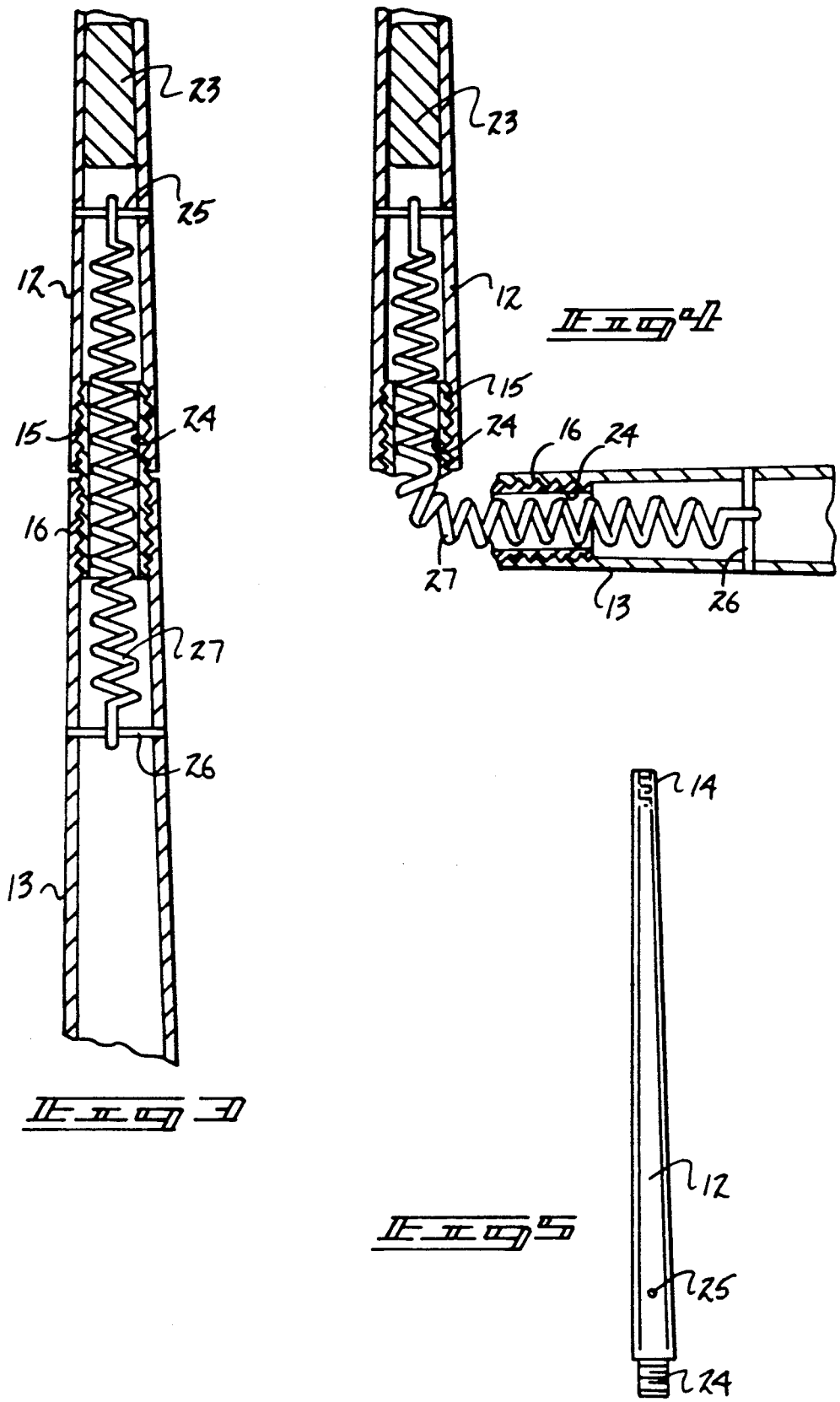

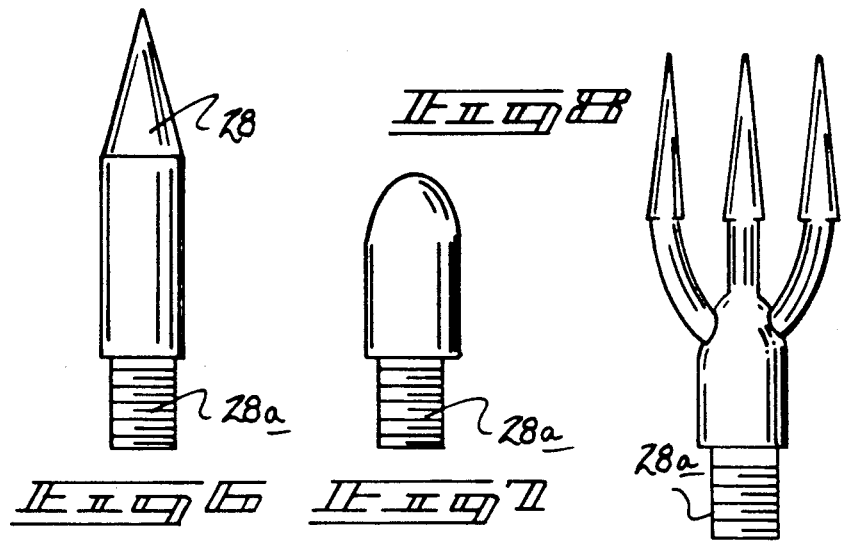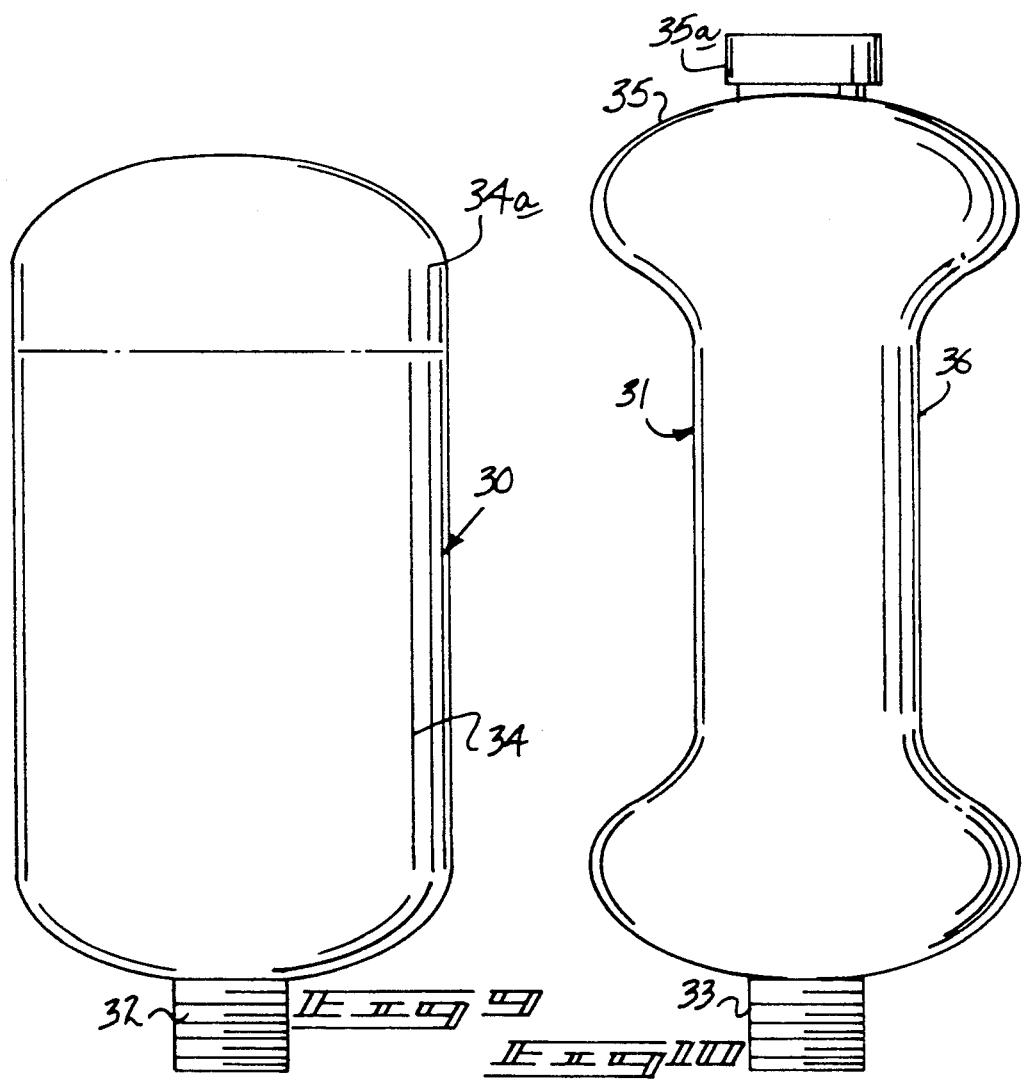

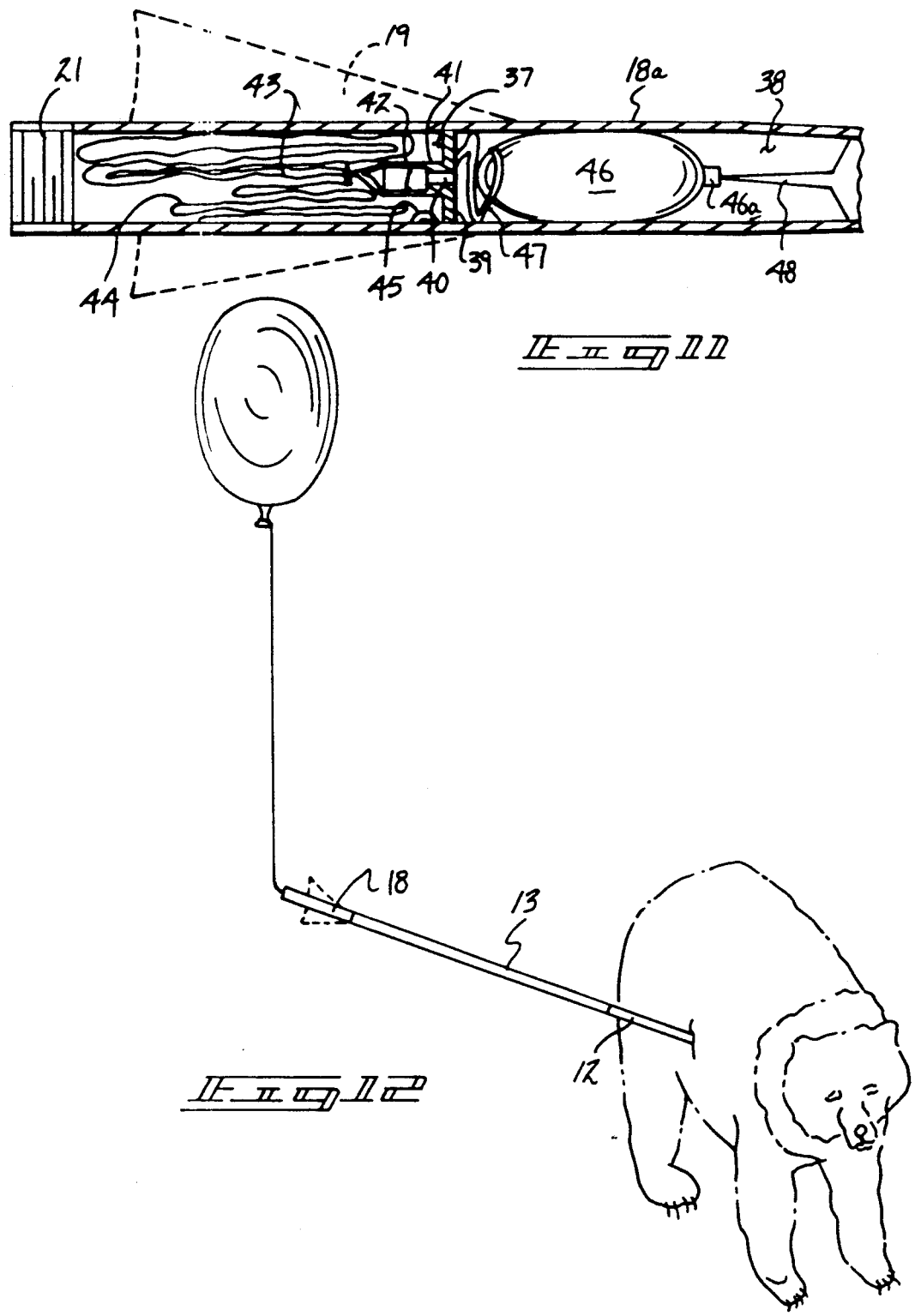

HUNTING SPEAR

BACKGROUND OF THE INVENTION

1. Field of the Invention

The field of invention relates to spear apparatus, and more particularly pertains to a new and improved hunting spear wherein the same is arranged to provide for a frangible interconnection between forward and rear sections of the spear structure.

2. Description of the Prior Art

Spear structure of various types is utilized in the prior art for hunting of various game such as fishing and game hunting.

In the use of such structure, the forward section of the spear to be impaled within an associated target or target animal is subject to separation due to an animal running subsequent to impact.

Prior art structure exemplifying a spear fishing organization is set forth in U.S. Pat. No. 4,209,929 to Mishima wherein a spear is held together utilizing surgical tubing to mount the spear head relative to the spear.

U.S. Pat. No. 4,429,480 to Stude sets forth a diving spear utilizing a tether line to secure the spear relative to a diver.

U.S. Pat. No. 4,272,905 to Hinkle sets forth a hunting gig to frogs and fish including removable tines mounted to a forward end of the spear structure.

As such, it may be appreciated that there continues to be a need for a new and improved hunting spear as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of spear apparatus now present in the prior art, the present invention provides a hunting spear wherein the same utilizes a frangible connection between a forward and rear portion of the hunting spear to permit separation of the forward and rear section in a hunting situation. As such, the general purpose of the present invention, which will be described subsequently in greater detail, is to provide a new and improved hunting spear which has all the advantages of the prior art hunting spear and none of the disadvantages.

To attain this, the present invention provides a spear structure defined by an elongate truncated conical body formed with a forward section and rear section intercommunicated by a frangible hollow sleeve arranged for separating the forward section relative to the rear section upon impact. A spring member directed through the sleeve and secured at its upper and lower distal ends to the forward and rear sections secures the forward and rear sections together upon such separation to preserve the rear section for reuse.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved hunting spear which has all the advantages of the prior art hunting spears and none of the disadvantages.

It is another object of the present invention to provide a new and improved hunting spear which may be easily and efficiently manufactured and marketed.

It is further object of the present invention to provide a new and improved hunting spear which is of a durable and reliable construction.

An even further object of the present invention is to provide a new and improved hunting spear which is susceptible of a low cost of manufacture with regard to both materials and labor, and which accordingly is then susceptible of low prices of sale to the consuming public, thereby making such hunting spears economically available to the buying public.

Still yet another object of the present invention is to provide a new and improved hunting spear which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic view, taken in elevation, of the instant invention.

FIG. 2 is an orthographic view, taken along the lines 2—2 of FIG. 1 in the direction indicated by the arrows.

FIG. 3 is an orthographic view, taken along the lines 3—3 of FIG. 2 in the direction indicated by the arrows.

FIG. 4 is an orthographic cross-sectional view of the FIG. 3 in a separated configuration of the interconnecting sleeve utilized by the invention.

FIG. 5 is an orthographic view, taken in elevation, of a replacement forward section utilized by the invention.

FIGS. 6, 7, and 8 are orthographic views, taken in elevation, of various hunting tips utilized by the invention.

FIGS. 9 and 10 are orthographic views, taken in elevation, of handle members arranged for selective securement to the aft end of the spear structure.

FIG. 11 is an orthographic cross-sectional view of a modified tail section portion of the hunting spear structure of the invention.

FIG. 12 is an isometric illustration of the modified apparatus as set forth in FIG. 11 in use.

DESCRIPTION OF THE PREFERRED EMBODIMENT

With reference now to the drawings, and in particular to FIGS. 1 to 12 thereof, a new and improved hunting spear embodying the principles and concepts of the present invention and generally designated by the reference numeral 10 will be described.

More specifically, the hunting spear 10 of the instant invention essentially comprises an elongate truncated conical body 11 formed with a forward truncated conical section 12 coaxially mounted forwardly to a rear truncated conical section 13 in a coaxial alignment between the forward and rear sections. The forward section includes a forward section internally threaded forward end 14 coaxially aligned with a forward section internally threaded rear end 15. A rear section internally threaded forward end 16 is coaxially aligned with a rear end internally threaded rear end portion 17, wherein each of the internally threaded portions are coaxially aligned relative to one another. A conical tail section 18 is optionally provided including a tail section externally threaded plug 22 received threadedly within the rear section internally threaded rear end 17. The tail section 18 is arranged to mount a cap 20 thereon that includes a forward boss portion receivable within the tail section rear end 21. With specific reference to the FIGS. 3 and 4, it is noted that an externally threaded hollow frangible sleeve 24 is formed with an externally threaded profile threadedly received within the forward section internally threaded rear end 15 and the rear section internally threaded forward end 16. The frangible sleeve is separable upon impact at a junction defined between the forward and rear sections 12 and 13, as illustrated in FIG. 4. It is noted in the FIGS. 3 and 4 that a balance weight plug 23 formed of a high density material such as lead and the like is positioned within the forward section 12 forwardly of the sleeve 24 and forwardly of a first cross shaft 25. The rear section 13 includes a second cross shaft 26 to arrange for mounting of a connector spring 27 therebetween whose forward and rear distal ends are secured to the respective first and second cross shafts 25 and 26. In this manner, upon separation of the forward section relative to the rear section, the resilience of the spring structure 27 maintains the rear and forward sections together minimizing damage such as when a wounded animal directs a spear through dense underbrush and the like.

The FIGS. 6-8 illustrate the use of various tip members 28, each including externally threaded boss 28a. The tip member of FIG. 6 is formed with a forward pointed end, wherein the tip member of FIG. 7 includes a blunt end for use in tournament competition and the like. A frog gigging spear tip utilizing a plurality of spaced parallel tines is provided.

The FIGS. 9 and 10 illustrate various handle portions to include a first and second replacement handle 30 and 31 respectively, each formed as a respective first and second container 34 and 35, each including a respective first and second container cap 34a and 35a. The containers are hollow and permit the containment of various fluids, as well as the enhanced manual grasping of the spear structure for use as a walking stick as required. The container 35 is also formed with a second container reduced central portion 36 positioned medially between raised projections forward and aft of the central portion for enhanced use as a handle. Each boss 32 and 33 is arranged for reception within the internally threaded tail section rear end 21, as required.

The FIGS. 11 and 12 illustrate the use of a modified tail section 18a that is formed with a first compartment 37 positioned forwardly of a second compartment 38 within the tail section 18a. A partition wall 39 divides the first and second compartments relative to one another, wherein the partition wall 39 includes a partition wall conduit 40 directed medially thereof, wherein the conduit is in pneumatic communication with a conduit nozzle 41 mounting a signal balloon 43. A check valve 42 mounted within the conduit nozzle 41 permits a one-way flow of air from the first compartment to the second compartment from an associated compressed gas canister 46 mounted within the first compartment coaxially aligned therewith. The signal balloon 43 includes a tether line 44 mounted thereto, whereupon projection of the signal balloon 43 from the tail section, such as illustrated in FIG. 12, the tether line that is mounted to a tether line anchor lug 45 within the internal wall surface of the second section maintains the signal balloon relative to the modified tail section 18 for signalling by use of balloons, such as those of luminescent coloration as to location of a quarry to be hunted.

The compressed gas canister 46 includes a canister biasing spring 47 mounted between a rear terminal end of the gas canister 46 and the partition wall 39 to bias the canister forwardly into communication with a piercing rod 48 coaxially aligned within the first compartment and fixedly mounted within the first compartment positioned forwardly of the compressed gas canister 46. The piercing rod 48 is positioned for communication with the canister mouth 46a directed therewithin, whereupon impact of the spear directs the piercing rod through the canister mouth 46a to release gas within gas canister, and as the gas canister is or a relatively loose fit defining a canister diameter less than a first compartment diameter, compressed gas is directed about the gas canister, through the conduit nozzle 41, through the check valve 42, and into the signal balloon 43 for its projection exteriorly of the tail section 18a for signalling as to location of the spear structure.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A hunting spear, comprising in combination, an elongate truncated conical body, including a forward truncated conical section securable to a rear truncated conical section, the forward truncated conical section including a spear tip securable to a forward section forward end, and the forward section including a forward section rear end, the rear section including a rear section forward end and a rear section rear end, the rear section forward end and the forward section rear end including securement means to coaxially align and secure the forward section to the rear section, wherein the securement means is formed of a frangible material, and the forward section rear end includes an internally threaded rear end and an internally threaded forward section forward end, wherein the internally threaded forward end and the internally threaded rear end are coaxially aligned and the rear section forward end includes an internally threaded forward end and the rear section rear end includes a rear section internally threaded rear end, wherein the rear section internally threaded forward end the rear section internally threaded rear end are coaxially aligned, and the securement means includes an externally threaded frangible hollow sleeve threadedly received within the forward section internally threaded rear end and the rear section internally threaded forward end, and including a first cross shaft mounted fixedly within the forward section forwardly of the forward section internally threaded rear end, and a second cross shaft fixedly mounted within the rear section spaced rearwardly of the rear section internally threaded forward end, and a connection spring, wherein the connection spring includes a spring forward distal end and a spring rear distal end, the spring forward distal end mounted to the first cross shaft, and the spring rear distal end mounted to the second cross shaft, and including a high density material mounted within the forward section positioned forwardly of the first cross shaft and rearwardly of the forward section internally threaded forward end to provide counter-balancing of the truncated conical body, and a conical tail section, the tail section including a tail section externally threaded plug threadedly receivable within the rear section internally threaded rear end, the tail section including an internally threaded tail section rear end coaxially aligned with the externally threaded plug, and including guide fletching mounted peripherally about the tail section, and a container member, the container member including a container member externally threaded boss, the externally threaded boss threadedly receivable within the internally threaded tail section rear end, and the container member including a reduced diameter central portion for use as a handle.

2. A hunting spear as set forth in claim 1 wherein the tail section includes a first compartment coaxially aligned and forwardly of a second compartment, and a partition wall defining an interface between the first compartment and the second compartment, and the partition wall including a partition wall conduit directed therethrough, and the partition wall conduit including a conduit nozzle coaxially aligned with the conduit and the conduit nozzle including a check valve permitting passage of pressurized air from the first compartment to the second compartment, and a signal balloon mounted about the conduit nozzle, the signal balloon including a signal balloon tether line mounted to the signal balloon, and the signal balloon tether line including a tether line forward distal end, the tether line forward distal end mounted to an anchor lug, the anchor lug mounted interiorly of the second compartment, and a compressed gas canister mounted within the first compartment coaxially aligned with the first compartment and slidably mounted therewithin, and a canister biasing spring positioned in contiguous communication with a rear terminal end of the gas canister and a forward surface of the partition wall biasing the gas canister forwardly, and the gas canister including a canister mouth, and piercing rod fixedly mounted within the first compartment forwardly of the canister, wherein the piercing rod is received within the canister mouth, whereupon impact of the truncated conical body effects projection of the canister towards the piercing rod to effect release of gas from the canister and through the partition wall conduit, the conduit nozzle, and the check valve into the signal balloon.

* * * * *